United States Patent
Klein et al.

(10) Patent No.: US 7,137,510 B1
(45) Date of Patent: Nov. 21, 2006

(54) FILTER ELEMENT

(75) Inventors: Gunnar-Marcel Klein, Weilheim (DE); Nikolaus Moser, Ditzingen (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 579 days.

(21) Appl. No.: 09/555,140

(22) PCT Filed: Nov. 20, 1998

(86) PCT No.: PCT/EP98/07487

§ 371 (c)(1),
(2), (4) Date: Aug. 3, 2000

(87) PCT Pub. No.: WO99/26710

PCT Pub. Date: Jun. 3, 1999

(30) Foreign Application Priority Data

Nov. 25, 1997 (DE) ................. 197 52 143

(51) Int. Cl.
B01D 39/18 (2006.01)

(52) U.S. Cl. ............ 210/491; 210/496; 210/504; 210/505; 442/400; 442/412

(58) Field of Classification Search ............ 210/489, 210/491, 493.1, 493.5, 496, 505, 508, 509, 210/504; 442/340, 346, 389, 390, 392, 400, 442/412

See application file for complete search history.

(56) References Cited

U.S. PATENT DOCUMENTS

| | | | | |
|---|---|---|---|---|
| 4,033,881 A | * | 7/1977 | Pall | 210/491 |
| 4,604,203 A | * | 8/1986 | Kyle | 210/489 |
| 4,824,451 A | * | 4/1989 | Vogt et al. | 55/528 |
| 4,910,064 A | * | 3/1990 | Sabee | 428/113 |
| 4,925,601 A | * | 5/1990 | Vogt et al. | 264/6 |
| 4,976,858 A | * | 12/1990 | Kadoya | 210/496 |
| 5,437,910 A | * | 8/1995 | Raabe et al. | 428/194 |
| 6,077,391 A | * | 6/2000 | Girondi | 162/129 |

FOREIGN PATENT DOCUMENTS

| | | | | |
|---|---|---|---|---|
| EP | 60677 A | * | 9/1982 | |
| EP | 338479 | * | 10/1989 | |
| EP | 338479 A | * | 10/1989 | |
| JP | 63278517 A | * | 11/1988 | ................. 210/496 |
| JP | 6-198108 | * | 7/1994 | |

OTHER PUBLICATIONS

English language Machine translation from the Japanese Patent office of JP 06-198,108 A, 1.64 pages.*
English language abstract from Derwent for EP 338,479 A, 3 pages.*
English language Translation of EP 338479 A (Klimmek et al) Oct. 25, 1998.*
English language translation of JP 06-198108.*

* cited by examiner

Primary Examiner—Matthew O. Savage
(74) Attorney, Agent, or Firm—Crowell & Moring LLP

(57) ABSTRACT

A filter element in which several layers (2, 3, 5, 7, 8) made of a filtering medium are joined contiguously in the direction of flow with at least one layer (2, 7) made of a filtering medium with a high storage capacity and a low degree of separation being arranged on the in-flow side and at least one layer (3, 8) made of a filtering medium with a low storage capacity and a high degree of separation being arranged on the out-flow side. Preferably the in-flow filtering medium is made of a filter paper containing cellulose or of a melt-blown material, and the out-flow side filtering medium is produced from a filter paper containing cellulose.

11 Claims, 2 Drawing Sheets

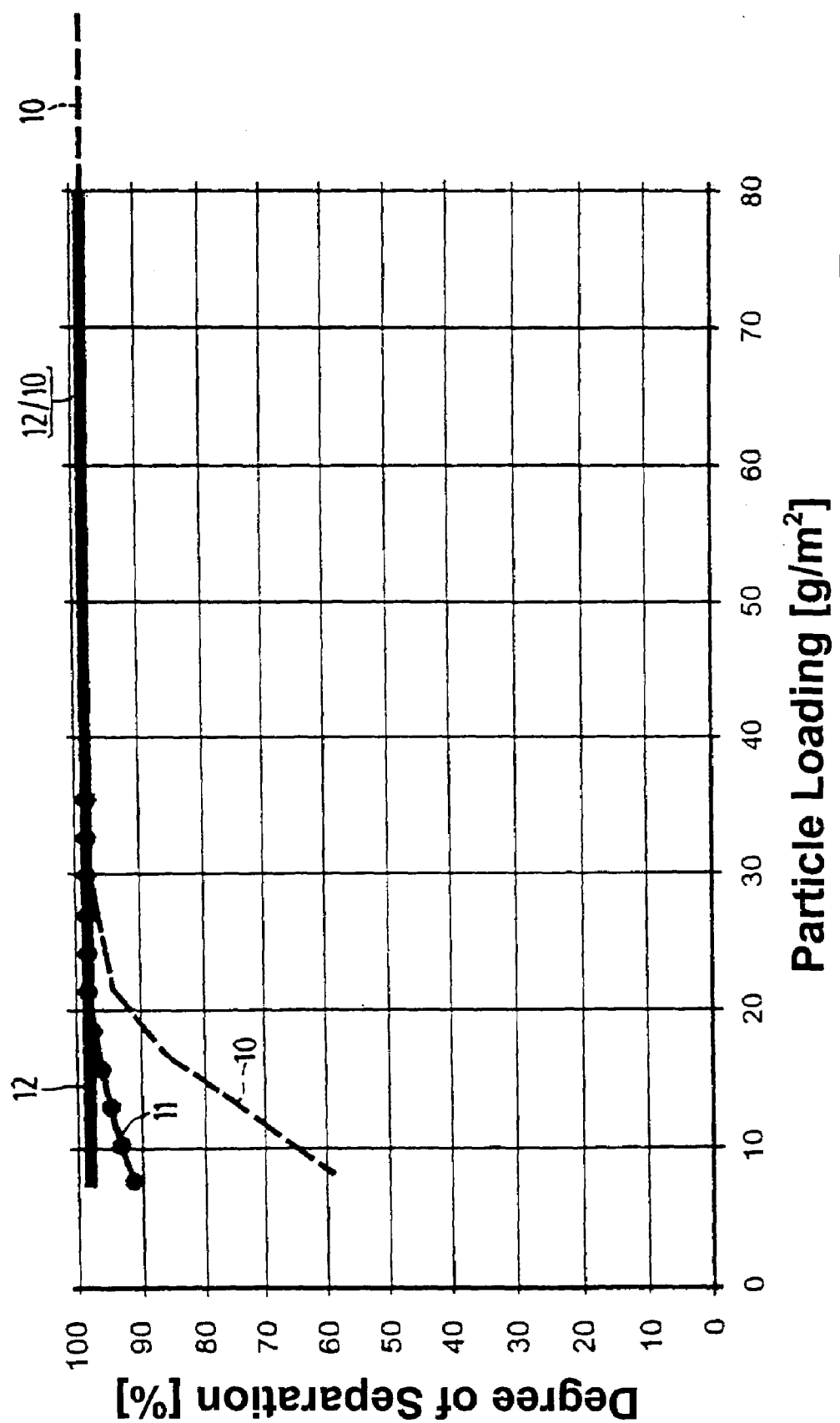

FILTER ELEMENT

BACKGROUND OF THE INVENTION

The invention relates to a filter element especially for filtering fluids.

It is known that different types of filter material can be used in known filter elements, combined to produce an optimum filter behavior for the particles to be filtered out and the fluid flowing through. For example, it is known from DE 44 43 158 A1 to use a melt-blown material as the filter medium in a gas stream together with a carrier material serving exclusively for stabilization.

It is also known from WO 96/34673 to locate a plurality of filter layers made of a melt-blown material on a carrier layer in a hollow cylindrical filter element. The layers then form together a replaceable filter element that can be placed in a filter system.

The sequential arrangement of nonwoven filter media made of synthetic fibers with staggered filter fineness is known from U.S. Pat. No. 5,496,627 and WO 95/17946, with the filter fineness of the filter layers increasing in the flow direction.

It is also known from U.S. Pat. No. 5,427,597 and WO 96/34673 to arrange several filter layers or only one filter layer of a nonwoven web made by the melt-blowing process on a carrier layer which serves primarily for stabilization. The filtering effect of the carrier layer is negligible in comparison to the other layers.

The processing of synthetic filter nonwoven webs, especially melt-blown nonwoven webs, to produce filters requires the use of support materials. For example, metal wire cloth or even cellulose-based filter papers are used for this purpose. When cellulose-based supporting layers have heretofore been used, only filter layers exhibiting a much smaller degree of separation than the synthetic filter layer have been used. In such case, the supporting layer has no influence on the filtration properties of the overall arrangement but requires a considerable amount of space. Overall, in this known concept, only a certain part (for example, 30%–50%) of the volume of the overall arrangement is used for filtration.

OBJECT OF THE INVENTION

It is the object of the invention to provide a filter element of the type described above such that the filtering effect is improved overall by a multilayer design and can be maintained over an extended period of time.

The filter element according to the invention is advantageously suited to achieve the stated object with the features of the main claim. In the filter elements according to the invention, several layers of a filter medium are arranged sequentially in the direction of flow through the filter with the filter fineness increasing in the direction of flow through the filter and with decreasing contaminant holding capacity of the individual layers to improve the overall capacity at a given filter fineness or to increase the filter fineness at a given capacity.

Advantageously, in a filter element according to the invention, the functions of foldability, support of the synthetic layers, and very fine filtration are integrated in the cellulose layer located on the outflow side. In contrast to the known arrangements, in the invention the entire filter volume is used for particle separation in a system with filter fineness increasing in the flow direction, whereby the finest filter layer is constructed as a predominantly cellulose-based filter layer in particular and not as a synthetic filter layer (for example, a melt-blown material).

With the invention, improvement of the processibility and an increase in mechanical stability to produce self-supporting filter elements folded in a star shape, especially for economical manufacture on rotating embossing folding machines, is furthermore achieved. The advantages of the arrangement according to the invention regarding filtration properties, utilization of space, and processibility are also obtained when the cellulose fibers also have larger diameters than the synthetic fibers.

In one preferred embodiment of the filter element according to the invention, the above-described cooperation of the various degrees of separation and storage capacities of the different layers is achieved by the fact that the inflow-side filter medium is comprised of a predominantly cellulose-containing filter paper and the outflow-side filter medium likewise is comprised of a predominantly cellulose-containing filter paper. In such a case, a suitably adjusted admixture of cellulose fibers in a paper filter produces a corresponding filtration effect of the respective layer as mentioned above.

The cellulose-containing filter papers can also have a foreign substance content of up to 50%, with the foreign substances possibly being glass fibers or polyester fibers.

In another embodiment, in an advantageous fashion, the in-flow side filter medium is a melt-blown material or is made of synthetic fibers and the outflow-side filter medium is a foldable filter paper.

The use according to the invention of so-called melt-blown nonwoven webs as a layer of a filter medium is extremely advantageous since these materials have a very high storage capacity for particles filtered from the fluid with a low resistance to flow through the filter by the medium to be filtered. This advantage is achieved by the small fiber diameter (approximately <2 µm) and the high porosity of the melt-blown nonwoven material. The filtering effect, especially the degree of separation, initially increases with the accumulation of filtered-out particles during the period of use. The filter fineness of the layer on the inflow side is chosen so that a sufficiently long service life for the filter element can be achieved with this degree of fineness.

In order to achieve a high degree of separation by the overall arrangement even in the initial phase of use of the filter element, here as well a filter paper with additives containing cellulose can advantageously be used as the outflow side layer. This material, even in the initial phase, exhibits a very high degree of separation for the particles to be filtered out, but with a storage capacity lower than that of melt-blown nonwoven web. All in all, a relatively long operating life can be achieved in all embodiments with at least two layers while simultaneously maintaining the high degree of separation of the filter element.

Advantageous embodiments can be formed by the fact that on the inflow side a melt-blown fleece with about 15 to 150 g/m$^2$ weight per unit area and on the outflow side a filter paper containing cellulose with about 50 to 200 g/m$^2$ weight per unit area are used. PP (polypropylene) can be used for example as a starting material for the melt-blown fleece, especially for non-aggressive fluids or PES (polyethersulfone) which can also be employed in the filtration of fuel or hydraulic oils and lubricating oils.

The good degree of separation of the finest filter layer is achieved here by compressing the fibers during the manufacturing process or by mechanical compression (calandaring) of the cellulose layer following the manufacturing process. It is especially advantageous in this context that compressed cellulose layers, even with very limited thickness, possess sufficient mechanical stability and hence a sufficient supporting function of the synthetic filter layer as well as sufficient mechanical strength of the entire filter system.

An advantageous further refinement of the filter element according to the invention is obtained when a third layer of a calendared melt-blown material is disposed between the inflow-side filter medium and the outflow-side filter medium.

Advantageous further processing of the filter layers according to the invention with the described gradient structure as far as storage capacity and degree of separation are concerned is preferably achieved by the fact that the assembled layers of filter media are star-folded to form the filter element. In particular the layers of filter media can be welded by ultrasound or joined by applying surface pressure during the folding process before or during folding, for example on an embossing and folding machine. The layers can also be glued with an adhesive whereby a powdered adhesive or a hot melt impregnating agent also can be used.

The field of application for the filter element according to the invention includes, for example, oil filter systems, especially for a motor vehicle. The multilayer filter elements described above are clearly superior to the known single-layer filter media as far as resistance to flow through the filter and capacity are concerned. Adjusted combinations of a few basic elements for the filter media permit a wide range of variation in filter properties so that increased service lives with existing structural volumes, increased filter fineness without negatively affecting service life, and a lower resistance to flow through the filter can be achieved with relatively simple means.

Additional advantageous embodiments are described hereinafter.

BRIEF DESCRIPTION OF THE DRAWINGS

Embodiments of filter elements according to the invention will be explained with reference to the drawing.

FIG. 5 shows a graph of the degree of separation which depends on the loading of the filter element with accumulated particles.

DETAILED DESCRIPTION OF PREFERRED EMBODIMENTS

Figure 1:
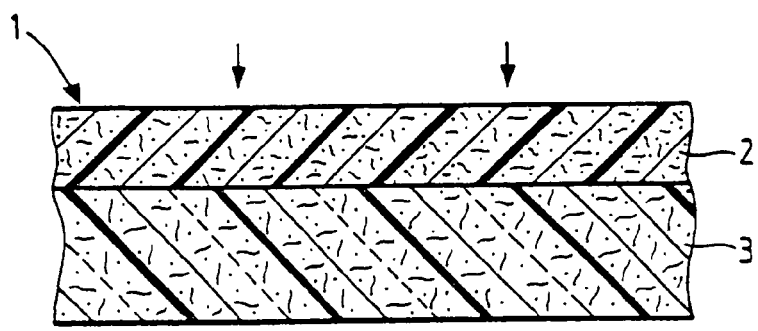
FIG. 1 shows a section through a filter element with an inflow-side layer of melt-blown nonwoven web and a outflow-side layer of cellulose-containing filter paper.

FIG. 1 shows a section through a filter element 1 with an inflow-side layer 2 of melt-blown nonwoven fleece and an outflow-side layer 3 of cellulose-containing filter paper. The melt-blown nonwoven fleece of layer 2 can be made for example with a fiber material having a weight per unit area of about 15 to 150 g/m² and on the outflow-side layer 3 can be made with cellulose-containing filter paper having a weight per unit area of approximately 50 to 200 g/m².

The starting material for the melt-blown nonwoven web may be, for example, PP (polypropylene), especially for non-aggressive fluids, or PES (polyethersulfone).

Figure 2:
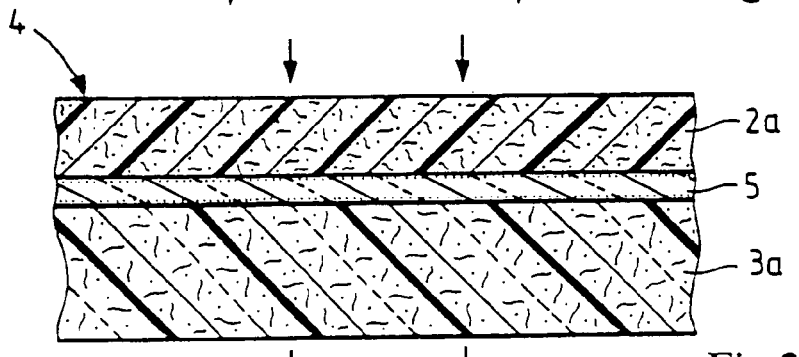
FIG. 2 shows a section through a filter element according to FIG. 1 with an intermediate layer.

In an embodiment of a filter element 4 according to FIG. 2, a third layer 5 of a calendared melt-blown material is arranged between the inflow-side layer 2 and the outflow-side layer 3.

Figure 3:
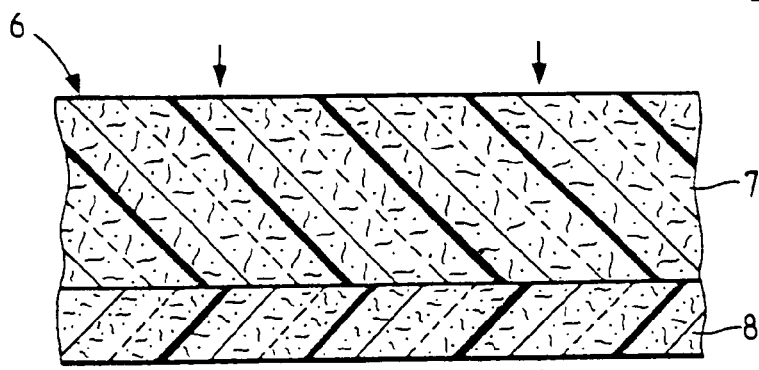
FIG. 3 shows a section through a filter element with an inflow-side layer and an outflow-side layer of cellulose-containing filter paper.

Another preferred embodiment of a filter element 6 is illustrated in FIG. 3. Here the inflow-side filter medium is composed of a layer 7 of a cellulose-containing filter paper, and a layer 8 which forms the outflow-side filter medium likewise is made of a cellulose-containing filter paper. In this embodiment, an appropriate filtering effect of the respective layer is obtained by an appropriately adapted mixing of cellulose fibers into a paper filter medium, as described further below.

Figure 4:
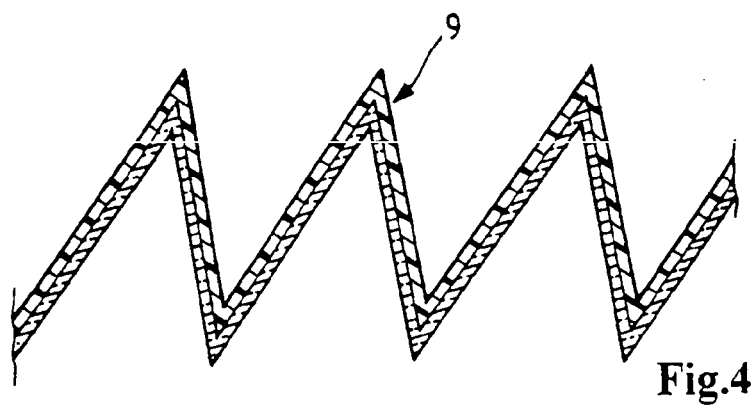
FIG. 4 is a schematic diagram of an example of star folding.

For further processing of the filter layers of filter element 1, 4, or 6 described with reference to FIGS. 1 to 3, the adjacently assembled layers of the filter media are star-folded according to the sketch in FIG. 4 to form a filter element 9. In this case the layers of filter media can be assembled to each other before or during folding, by ultrasonic welding, by gluing, or by surface pressure during the folding process, for example on an embossing and folding machine.

To make the various filtering effects clear, according to a diagram in FIG. 5, curves are shown for the progression of the degree of separation (%) which depends on the particle load (g/m²) of the filter element. Here the curve shows for example a curve 10 for the inflow-side layer 2 (see FIG. 1) consisting of a melt-blown nonwoven web, and curve 11 shows the progression for the outflow-side layer 3 (see FIG. 1) made of a cellulose-containing paper material. Curve 12 shows the effect of a combination of the two layers 2 and 3 according to FIG. 1.

It can be seen from the diagram in FIG. 5 that when the particle loading begins on the inflow side, a layer 2 of a filter medium is produced with a high storage capacity and low degree of separation for the particles to be filtered out, and on the outflow side there is a layer 3 of a filter medium with a low storage capacity and high degree of separation for the particles to be filtered out.

The invention claimed is:

1. A filter element comprising a plurality of filter medium layers joined together such that a fluid to be filtered flows successively through the layers in a flow direction commencing with an inflow layer and ending with a discharge layer, wherein successive layers in said flow direction exhibit an increasing degree of separation and a decreasing storage capacity for particles to be filtered out of said fluid, and wherein said inflow layer is comprised of synthetic fibers of a melt-blown nonwoven web with a fiber diameter of about 2 µm or less and a weight per unit area of about 15 to 150 g/m², and said discharge layer is comprised of a predominantly cellulose-containing pre-compressed filter paper having a weight per unit area of about 50 to 200 g/m².

2. A filter element according to claim 1, wherein at least three filter medium layers are joined together; wherein the discharge layer is a predominantly cellulose-containing filter paper which serves primarily to stabilize the filter element;
    wherein all the other layers are nonwoven webs made of synthetic fibers, and wherein said other layers in the direction of flow through the filter successively exhibit an increased degree of separation and a decreased storage capacity for particles to be filtered out from the fluid flowing through the filter element.

3. A filter element according to claim 2, wherein an intermediate filter medium layer located between the inflow-side filter medium and the outflow-side filter medium comprises a compressed melt-blown nonwoven web having a weight per unit area of 15 to 150 g/m².

4. A filter element according to claim 1, wherein the filter media joined together to form the filter element are star-folded.

5. A filter element according to claim 1, wherein the layers of filter medium are welded together by ultrasound.

6. A filter element according to claim 1, wherein the filter medium is folded to form pleats and wherein the layers of filter medium are joined together by surface pressure during a folding process.

7. A filter element according to claim 1, wherein the layers of filter medium are adhesively bonded together by gluing with powdered adhesive or with a hot melt impregnating agent.

8. A filter element according to claim 1, wherein at least one of the cellulose-containing filter layers includes up to but not including 50% of synthetic fibers.

9. A filter element according to claim 8, wherein said synthetic fibers are polyester fibers or glass fibers.

10. A filter element comprising a plurality of filter medium layers joined together such that a fluid to be filtered flows successively through the layers in a flow direction commencing with an inflow layer and ending with a discharge layer, wherein successive layers in said flow direction exhibit an increasing degree of separation and a decreasing storage capacity for particles to be filtered out of said fluid, and wherein said inflow layer is comprised of synthetic fibers of a melt-blown nonwoven web with a fiber diameter of about 2 μm or less and a weight per unit area of about 15 to 150 g/m² or of a predominantly cellulose-containing filter paper, with a weight per unit area of 50 to 200 g/m², and said discharge layer is comprised of a predominantly cellulose-containing pre-compressed filter paper having a weight per unit area of about 50 to 200 g/m².

11. A filter element comprising a plurality of filter medium layers joined together such that a fluid to be filtered flows successively through the layers in a flow direction commencing with an inflow layer and ending with a discharge layer, wherein successive layers in said flow direction exhibit an increasing degree of separation and a decreasing storage capacity for particles to be filtered out of said fluid, and wherein said inflow layer is comprised of synthetic fibers of a melt-blown nonwoven web with a fiber diameter of about 2 μm or less and a weight per unit area of about 15 to 150 g/m², and said discharge layer is comprised of a predominantly cellulose-containing pre-compressed filter paper having a weight per unit area of at least about 50 g/m².

\* \* \* \* \*